United States Patent [19]
Lawson

[11] Patent Number: 4,463,965
[45] Date of Patent: Aug. 7, 1984

[54] TRAILER MOUNTED BOAT RETAINER DEVICE

[76] Inventor: Floyd A. Lawson, 707 Mill St., Northport, Mich. 49670

[21] Appl. No.: 426,853

[22] Filed: Sep. 29, 1982

[51] Int. Cl.³ .............................................. B62D 3/10
[52] U.S. Cl. .................. 280/414.1; 280/510; 414/536
[58] Field of Search .................. 280/414.1, 414.3, 510; 414/536; 114/344

[56] References Cited

U.S. PATENT DOCUMENTS

| | | | |
|---|---|---|---|
| 2,636,744 | 4/1953 | Trees | 280/510 |
| 2,763,384 | 9/1956 | Foster | 414/536 |
| 3,750,805 | 8/1973 | Finney | 414/536 |
| 3,989,267 | 11/1976 | Robinson | 280/414.1 |

*Primary Examiner*—Joseph F. Peters, Jr.
*Assistant Examiner*—D. Lynn Fugate
*Attorney, Agent, or Firm*—James D. Hall

[57] ABSTRACT

A retainer device for use in combination with a boat trailer. The device includes a platform member having a slot formed therein which receives the bow eyelet of a boat. A hook is attached to the platform member and may secure the bow eyelet within the slot.

5 Claims, 6 Drawing Figures

TRAILER MOUNTED BOAT RETAINER DEVICE

SUMMARY OF THE INVENTION

This invention relates to a retainer device and will have specific application for securing the bow eyelet of a boat to a trailer.

The retainer device of this invention serves to allow a boat to be launched or loaded by a single person. The device includes a frame with a pivotally attached platform member. A slot is formed in one end edge of the platform to receive a boat carried securement device, such as the bow eyelet, which is retained by a pivoted securement hook attached to the platform.

The retainer device may be equipped for attachment to a standard boat trailer post. With the device attached to the trailer post, a boat may be driven or pulled onto the trailer and advanced until its bow eyelet extends into the platform slot, whereupon the securement hook engages and secures the bow eyelet. The trailer and secured boat can then be pulled out of the water by the vehicle to which the trailer is attached. To unload the boat, a release is provided for the securement hook. The device, when detached from the boat trailer, may be compactly folded for storage or shipping.

Accordingly, it is an object of this invention to provide for a retainer device which effectively secures a boat as the boat is pulled or driven onto a trailer.

Another object is to provide for a retainer device which is for a boat and which allows a single person to perform the task of launching or loading the boat from a trailer.

Another object is to provide a retainer device which is for securing a boat to a trailer and which works efficiently and safely and is economical.

Still another object is to provide an adjustable boat securing device which is for a trailer and which is easy to store.

Other objects will become apparent upon a reading of the following description.

BRIEF DESCRIPTION OF THE DRAWINGS

A preferred embodiment of this invention has been chosen for purposes of illustration wherein.

DESCRIPTION OF THE PREFERRED EMBODIMENT

The preferred embodiment herein described is not intended to be exhaustive or to limit the invention to the precise form disclosed. It is chosen and described to best explain the principles of the invention so that others skilled in the art may utilize the invention.

Figure 1:
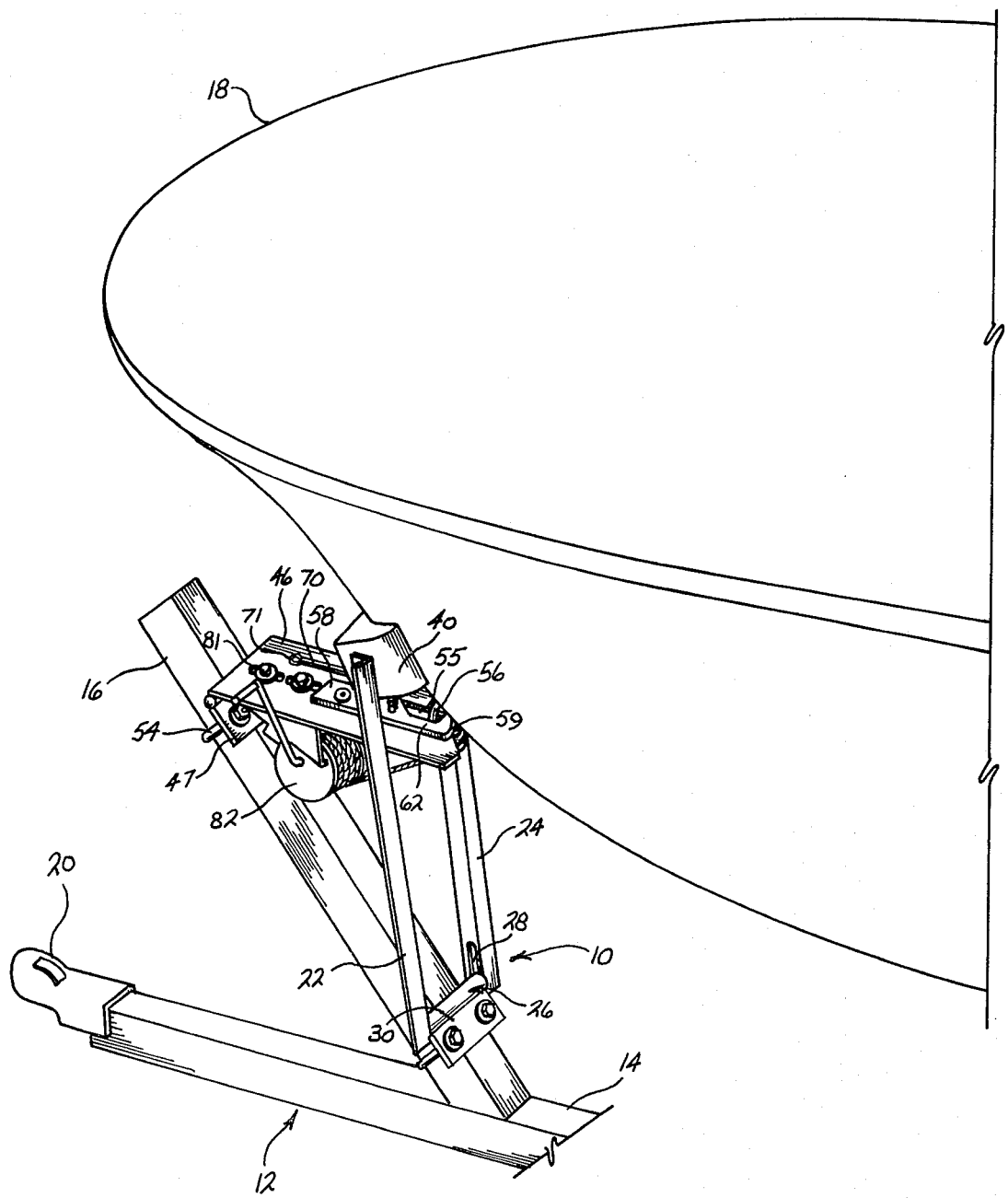
FIG. 1 is a fragmentary perspective view of the retainer device of this invention shown securing a boat upon a trailer.
Figure 2:
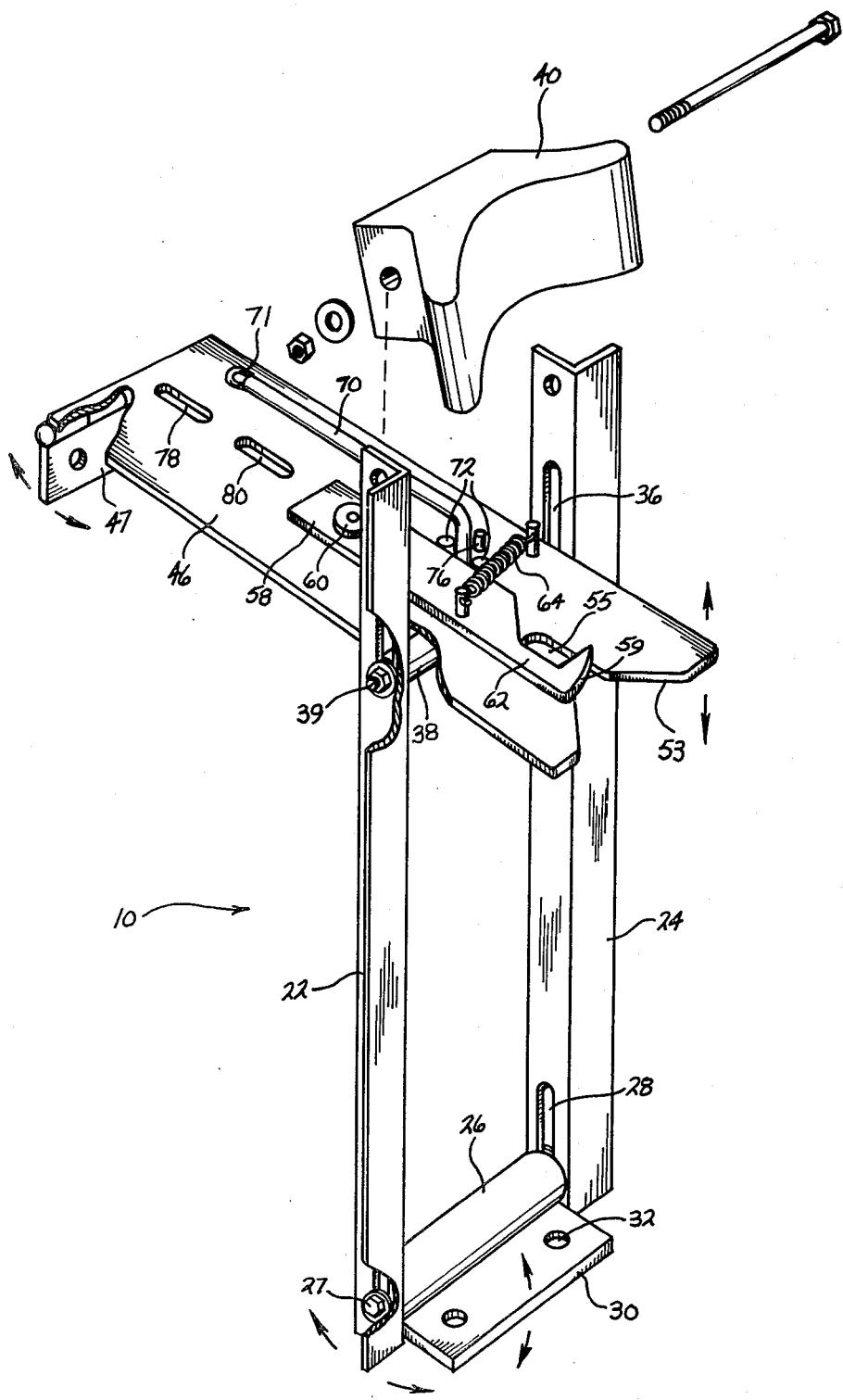
FIG. 2 is a perspective view of the retainer device with portions cut away for purposes of illustration.
Figure 3:
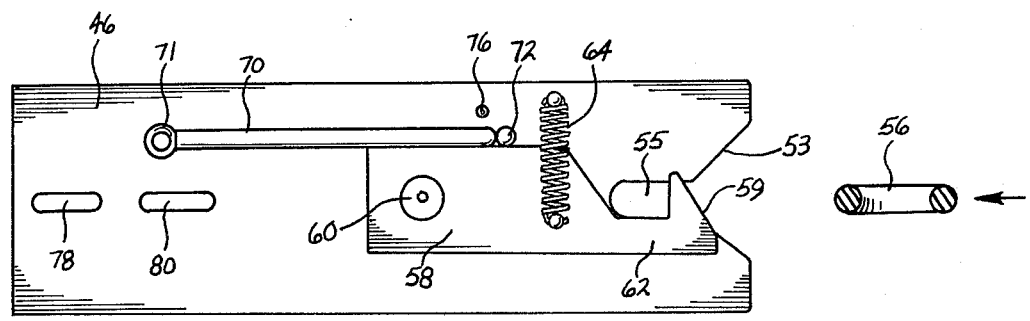
FIG. 3 is a top view of a portion of the retainer device with its securement hook in its closed position prior to receiving the bow eyelet of a boat.
Figure 4:
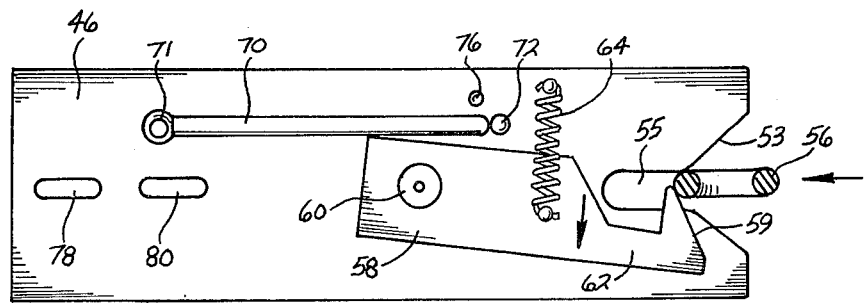
FIG. 4 is a sequential top view of a portion of the retainer device with its securement hook in a cammed intermediate position receiving the boat bow eyelet.

The retainer device 10 of this invention may be constructed so as to be used on a standard boat trailer 12 shown partially in FIG. 1. Trailer 12 includes a generally horizontal frame 14 carried upon wheels, not shown. Trailer 12 usually also includes cradles, not shown, which support boat 18 upon the trailer. Trailer 12 is secured to a towing vehicle by suitable hitch 20. A post 16 extends generally upwardly from frame 14 behind hitch 20. The specific construction of trailer 12 can vary.

Retainer device 10 includes parallel frame members 22, 24. A rod part 26 extends between frame members 22, 24 and is pivotally secured by a nut and bolt 27 within elongated frame openings 28 at one end of the frame members. An attachment part 30 is connected to rod 26 and includes U-bolt mounting holes 32. A rod part 38 extends between frame members 22, 24 and is pivotally secured by a nut and bolt 39 within elongated frame openings 36 near the opposite end of the frame members from rod part 26. A platform 46 is secured to and carried upon rod part 38, projecting between frame members 22, 24. One end edge of platform 46 is provided with a slot 55 having a flared opening 53. The opposite end edge of platform 46 carries a hinge connected attachment part 47 having spaced U-bolt mounting holes 52. A resilient bumper 40 is secured between frame members 22, 24 above platform 46.

Figure 5:
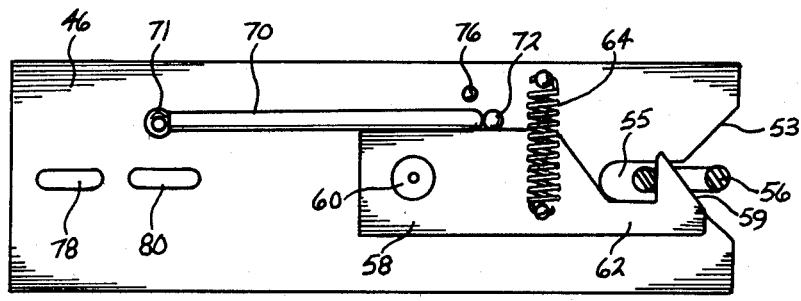
FIG. 5 is a sequential top view of a portion of the retainer device with its securement hook in its closed position securing the boat bow eyelet.

A securement hook 58 is pivotally mounted on platform 46 by a bolt 60. Hook 58 is rotatable about bolt 60 with its hooked terminal end 62 extending across slot 55. An actuating arm 70 is pivotally attached to platform 46, next to hook 58. Arm 70 includes a pair of oppositely located projections 72, positioned next to hook 58 along its hook opened edge 62 at the rotation axis of arm 70. A spring 64 is attached between platform 46 and hook 58 to urge the hook against arm projections 72. By pivoting arm 70 in either a clockwise or counterclockwise direction, hook 58 may be shifted between its open position shown in FIG. 6 and its closed position shown in FIG. 5. A stop pin 76 is carried by platform 46 and limits pivoting movement of arm 70 in both clockwise and counterclockwise directions.

Also formed within platform 46 are openings 78, 80 which receive bolts 81 to secure a winch 82 to the retainer device. Winch 82 is used to pull the boat 18 upon trailer 12 and to control the movement of the boat when unloading. U-bolts 54 pass about trailer post 16 and are secured to attachment parts 30 and 47. Frame openings 28 and 36 allow the retainer device to be adjusted to accommodate the particular trailer and boat.

Figure 6:
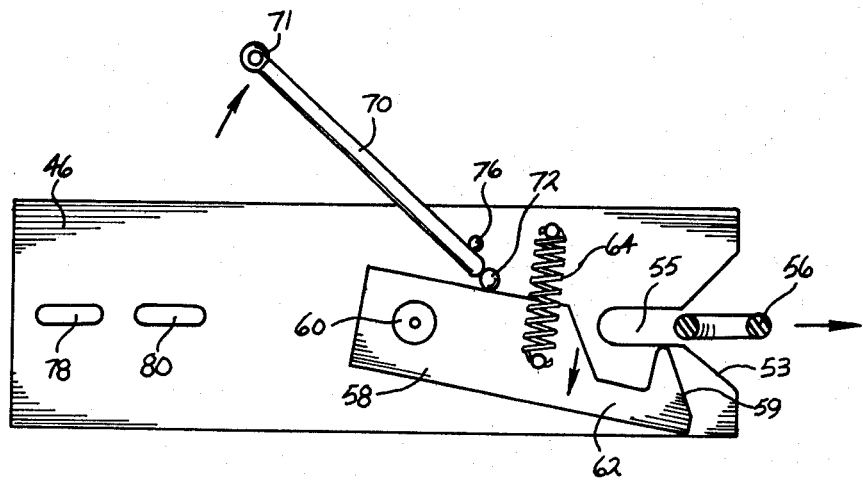
FIG. 6 is a sequential top view of a portion of the retainer device with its securement hook being opened to release the boat bow eyelet.

The mode of operation of retainer device 10 is shown sequentially in FIGS. 3-6. As boat 18 is pulled by winch 82 or driven onto trailer 12, its bow eyelet 56 enters platform slot 55 and contacts camming edge 59 of hook 58, forcing hook 58 into its open position. Once bow eyelet 56 passes end 62 of hook 58, the hook closes about the bow eyelet, securing it to retainer device 10. When it is desired to unload boat 18 from trailer 12, actuating arm 70 is pivoted, such as is shown in FIG. 6, forcing hook 58 into its open position. Boat 18 may then be pushed or ridden off boat trailer 12 and into the water. A line could be attached to the handle part of arm 70 at ring 71 to enable the arm to be pivoted either clockwise or counterclockwise from the boat if desired.

When not in use, retainer device 10 can be removed from the trailer and platform 46 pivoted about rod 38 until it is generally coplanar with frame members 22, 24, forming a generally flat configuration to allow easy storage or shipment of the device.

It is to be understood that the above description does not limit the invention to the precise forms disclosed, and that it may be modified within the scope of the appended claims.

I claim:

1. A retainer device for use in combination with a boat trailer, said retainer device adapted to engage the bow eyelet of a boat when resting upon said trailer, said trailer including a generally horizontal frame part, a generally upright front post member attached to said frame part, said retainer device comprising a frame adapted for attachment to said trailer post member, a platform member carried by said device frame, said platform member including a guide slot means opening at one edge of the platform member for receiving said boat bow eyelet, the other end of said platform member including means for connecting said attachment device to said trailer front post member, a securement means pivotally attached to said platform member for engaging and securing said bow eyelet within said slot means and being shiftable between a first position whereby said slot means is open to receive said boat bow eyelet and a second position whereby said securement means extends into said slot means to engage and secure the boat bow eyelet within the slot means, actuating means located in mechanical communication with said securement means for manually shifting the securement means about a pivot axis between its said first and second positions, said actuating means including a rod pivotally mounted on said platform member adjacent a side edge of said securement means, said rod pivotable about a pivot axis spacedly located from said securement means pivot axis and including spaced projections on opposite sides of said rod pivot axis whereby pivoting movement of said rod in one direction causes one of said rod projections to contact said securement means side edge to urge said securement means into its said first position and pivoting movement of said rod in the opposite direction causes the other of said rod projection to contact said securement means side edge to urge the securement means into its said first position.

2. The device of claim 1 wherein said securement means pivots relative to said platform about a pivot axis, a biasing means normally urging said securement means into its said second position, said securement means includes a side edge terminating in a hook, said hook extending into said slot means when said securement means is in its said second position, said securement means including a camming part adjusted for contact with said boat bow eyelet when the securement means is in its said second position to urge the securement means into its said first position as the boat bow eyelet advances into said slot means.

3. The device of claim 1 and limiting means fixedly carried by said platform and spaced from said rod for restricting movement of said rod.

4. A retainer device for use in combination with a boat trailer, said retainer device adapted to engage the bow eyelet of a boat when resting upon said trailer, said retainer device comprising a pair of parallel frame members and a platform member located between and pivotally attached to said frame members, said platform member including a guide slot means formed in its one end edge for receiving said boat bow eyelet, securement means pivotally attached to said platform and being shiftable between a first position wherein said slot means is open to receive said boat bow eyelet and a second position wherein said securement means extends into said slot means to engage and secure the bow eyelet within the slot means, said platform being rotatable within said frame members from an operating position in which said platform is angularly oriented relative to said frame members into a stored position, wherein the platform is generally co-planar with the frame members, said frame members carrying attachment means spaced from said platform for securement to said boat trailer, and said platform carrying other attachment means for securement to said boat trailer.

5. The retainer device of claim 4 and a bumper means carried by said frame members spaced from said platform for contact with said boat.

* * * * *